United States Patent
Sato et al.

(10) Patent No.: US 8,188,967 B2
(45) Date of Patent: May 29, 2012

(54) LIQUID CRYSTAL DISPLAY

(75) Inventors: Katsunari Sato, Toda (JP); Yoshiharu Yamashita, Yokohama (JP); Takeshi Miitsu, Isehara (JP); Hiroyoshi Ogura, Isehara (JP); Hiroki Hosono, Isehara (JP); Koichi Sato, Isehara (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 12/429,231

(22) Filed: Apr. 24, 2009

(65) Prior Publication Data

US 2010/0053049 A1 Mar. 4, 2010

(30) Foreign Application Priority Data

Sep. 4, 2008 (JP) ................................. 2008-226679

(51) Int. Cl.
*G09G 3/36* (2006.01)
(52) U.S. Cl. .......................................... 345/102; 349/58
(58) Field of Classification Search .................... 345/87, 345/102; 349/58, 65, 149, 150; 362/632
See application file for complete search history.

(56) References Cited

U.S. PATENT DOCUMENTS

| 7,936,136 B2 * | 5/2011 | Inoue et al. ................... 315/312 |
| 2006/0152471 A1 | 7/2006 | Sugawara |

FOREIGN PATENT DOCUMENTS

| JP | 09-304627 | 11/1997 |
| JP | 2001-006419 | 1/2001 |
| JP | 2006-195146 | 7/2006 |
| JP | 2007-042444 | 2/2007 |
| JP | 2007-052285 | 3/2007 |

* cited by examiner

*Primary Examiner* — Abbas Abdulselam
(74) *Attorney, Agent, or Firm* — Antonelli, Terry, Stout & Kraus, LLP.

(57) ABSTRACT

A liquid crystal display has a liquid crystal panel, a gate chip on film (COF) disposed at a side of a side surface of the liquid crystal panel, side-edge-type backlights having a light emitting diode disposed on left and right side surfaces of the liquid crystal panel, and a cover and a frame that hold the liquid crystal panel and the backlights, the frame has an opening disposed at a position corresponding to the position of the gate COF into which the gate COF is inserted, and a lid for covering the gate COF inserted in the opening is connected to the frame in such a manner that the lid is capable of being opened and closed.

7 Claims, 7 Drawing Sheets

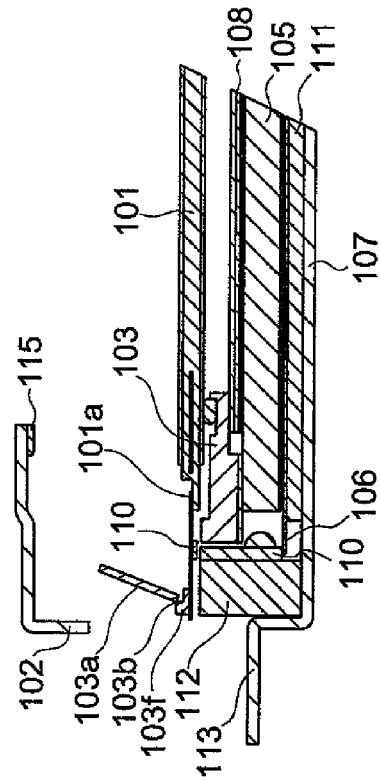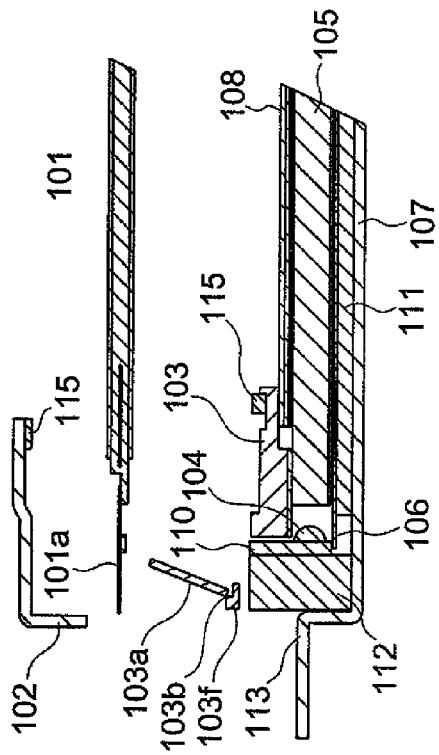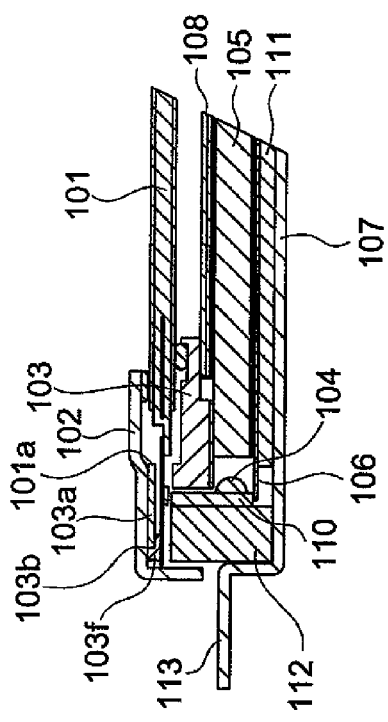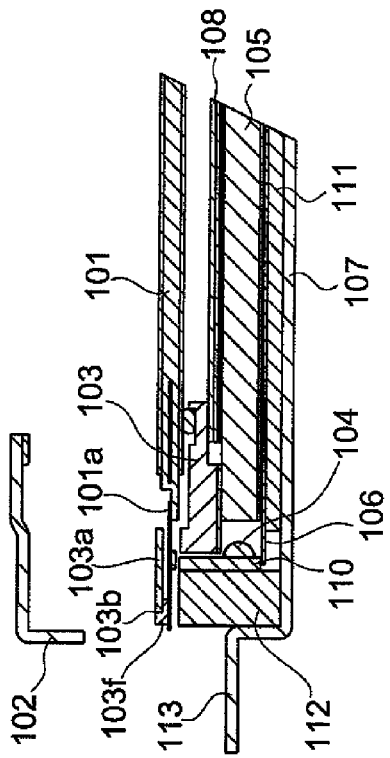

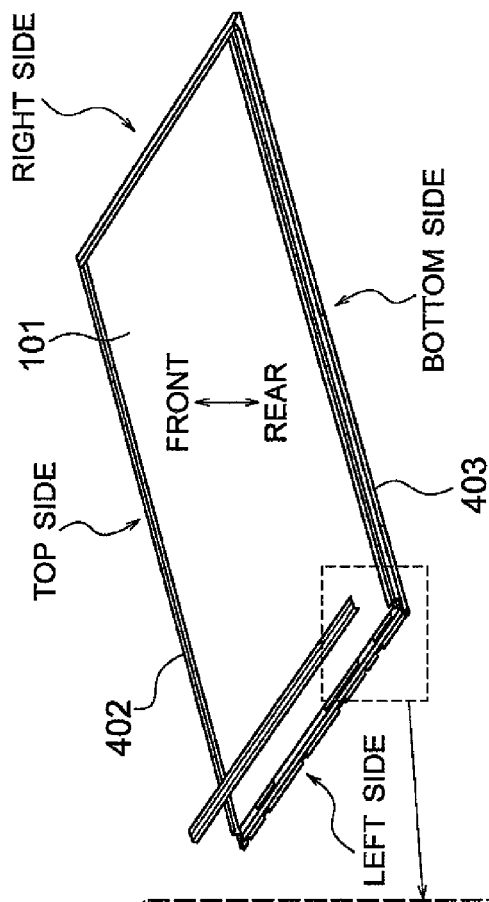
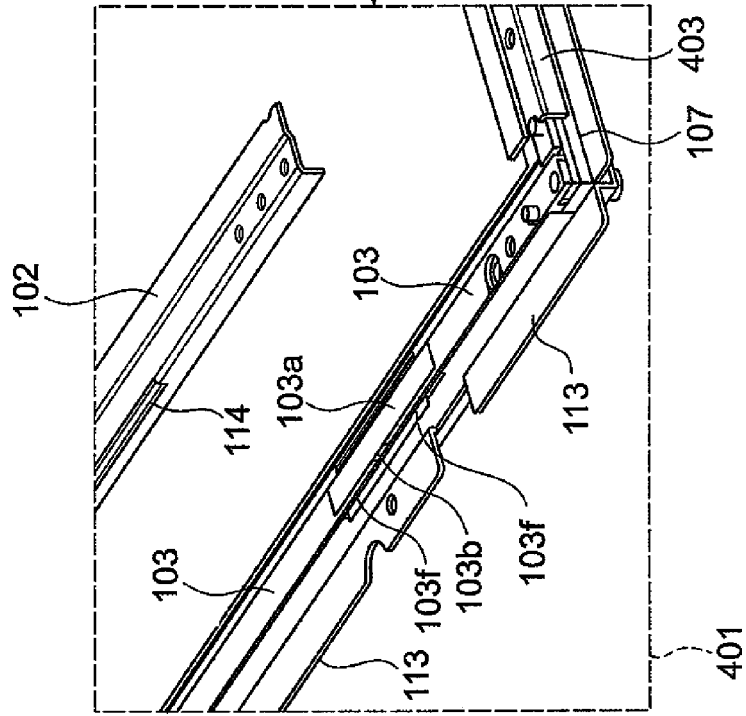
FIG. 4A
FIG. 4B

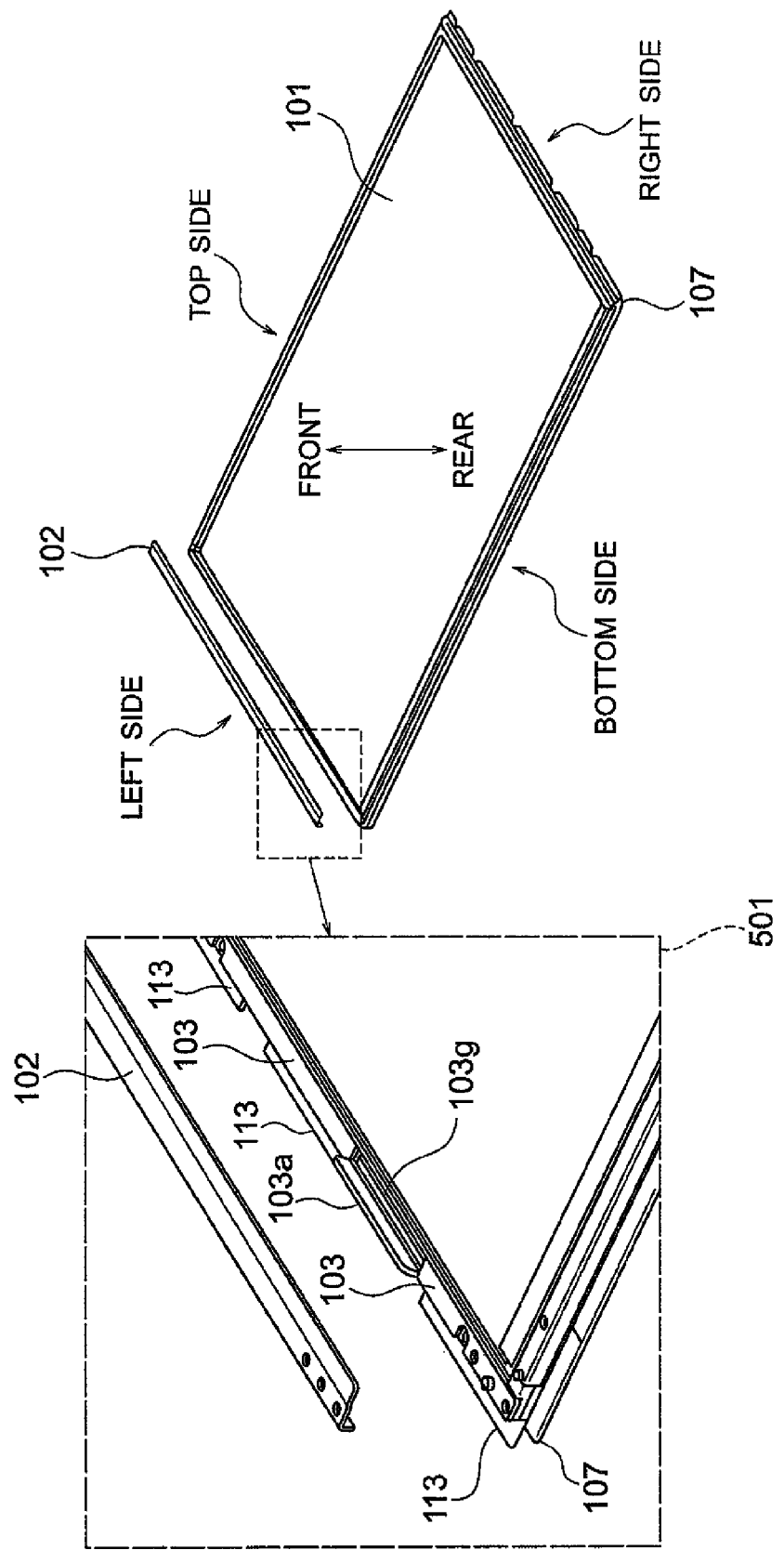

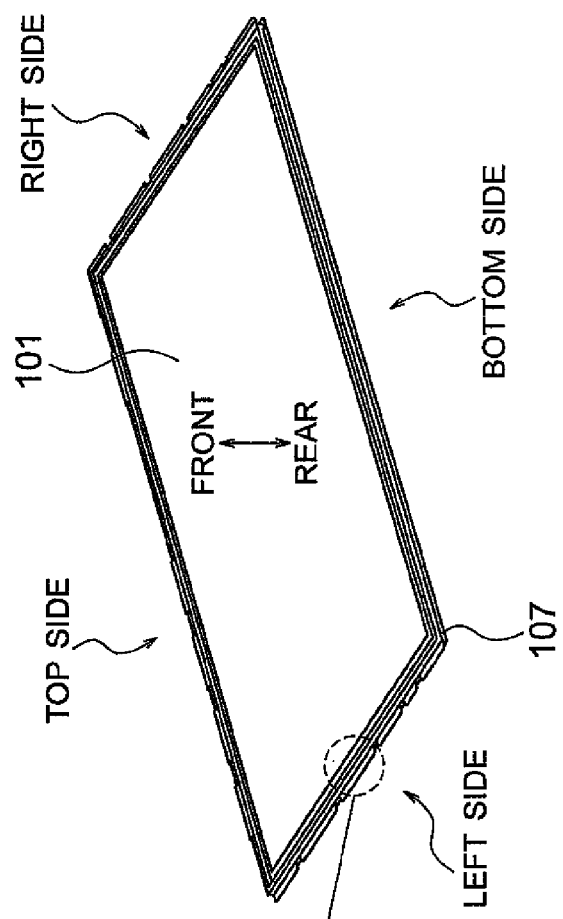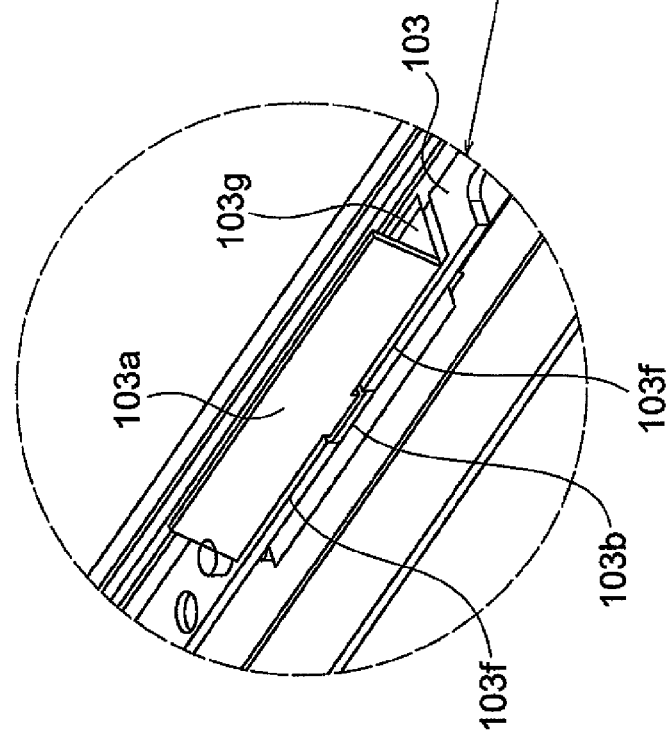

LIQUID CRYSTAL DISPLAY

INCORPORATION BY REFERENCE

The present application claims priority from Japanese application JP2008-226679 filed on Sep. 4, 2008, the content of which is hereby incorporated by reference into this application.

BACKGROUND OF THE INVENTION (1) Field of the Invention

The present invention relates to a liquid crystal display, for example. In particular, it relates to a side-edge type liquid crystal display that incorporates a light emitting diode.

(2) Description of Related Art

In recent years, television broadcast has been digitalized and improved in definition, and thus, there is a demand for a flat-screen image display with a larger size (larger screen) as a television receiver. As the large-size flat-screen image display, in addition to the conventional projection display, liquid crystal displays (LCDs) using a flat panel display (FPD), such as a plasma display panel (PDP) and an organic electroluminescence (OEL) panel, have appeared on the market.

Of the liquid crystal displays, an LCD that requires a light source as a backlight has the backlight reduced in thickness to reduce the thickness of the whole of the LCD, as described in JP-A-2001-006419 and JP-A-2006-195146.

BRIEF SUMMARY OF THE INVENTION

To reduce the thickness of the backlight to reduce the thickness of the liquid crystal display, the backlight system is shifting from the conventionally commonly used direct-type backlight having a light source installed on the back side of the liquid crystal panel to the side-edge-type backlight, as described in JP-A-2001-006419, JP-A-2006-195146, JP-A-2007-052285, JP-A-2007-042444 and JP-A-9-304627, for example.

The side-edge-type backlight has a bar-shaped light source, such as a cold cathode fluorescent lamp, installed on a side of a light guide plate. The light emitted from the bar-shaped light source is incident on the side of the light guide plate and guided by the light guide plate and a reflecting sheet in closely contact with the lower surface of the light guide plate to provide uniform light that illuminates the liquid crystal panel disposed over the light guide plate.

According to the patent documents described above, measures are taken to prevent light leakage that occurs because of the structure of the backlight. However, since the light source is a bar-shaped light source, such as a cold cathode fluorescent light, the area of the rim part of the liquid crystal panel, which is not the effective pixel area, is large, the power consumption is high, and the weight is heavy.

In view of the problems described above, an object of the present invention is to provide a liquid crystal display that has a narrower rim part, a higher light emission efficiency and a lower power consumption than conventional products.

In order to achieve the object described above, the present invention provides a liquid crystal display incorporating a side-edge-type backlight having an LED as a light source, characterized in that a frame has a lid capable of being opened and closed.

Specifically, a liquid crystal display according to the present invention comprises: a liquid crystal panel; a gate chip on film (COF) disposed at a side of a side surface of the liquid crystal panel; side-edge-type backlights having a light emitting diode disposed on left and right side surfaces of the liquid crystal panel; and a cover and a frame that hold the liquid crystal panel and the backlights, the frame has an opening disposed at a position corresponding to the position of the gate COF into which the gate COF is inserted, and a lid for covering the gate COF inserted in the opening is connected to the frame in such a manner that the lid is capable of being opened and closed.

The lid is preferably connected to the frame via a hinge in such a manner that the lid is capable of being opened and closed.

A reflecting surface may be disposed on a surface of the frame that faces the cover and/or a surface of the lid that faces the gate COF.

The lid, the hinge and the frame may be integrally molded. In addition, the lid and the hinge may be made of a same material as the reflecting surface.

Another cover that cooperates with the cover to sandwich the frame may be disposed at a side of the lid that is on the side of a front surface of the liquid crystal panel.

According to the present invention, since an LED light source is used for backlight, the power consumption is low, and the life is long. In addition, since the backlight is the side-edge type, the thickness of the liquid crystal display can be reduced. In addition, according to the present invention, the width of the rim can be reduced. In addition, the light emission efficiency can be improved. In addition, the number of components can be reduced.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 3 includes partially exploded cross-sectional views for illustrating a procedure of disassembling the liquid crystal display according to the embodiment;

FIG. 4 includes perspective views showing a state where a lid 103a according to the embodiment is closed;

FIG. 5 includes perspective views showing a state where the lid 103a according to the embodiment is open;

FIG. 7 includes perspective views showing a state where the lid 103a according to the embodiment is open.

DETAILED DESCRIPTION OF THE INVENTION

Figure 1:
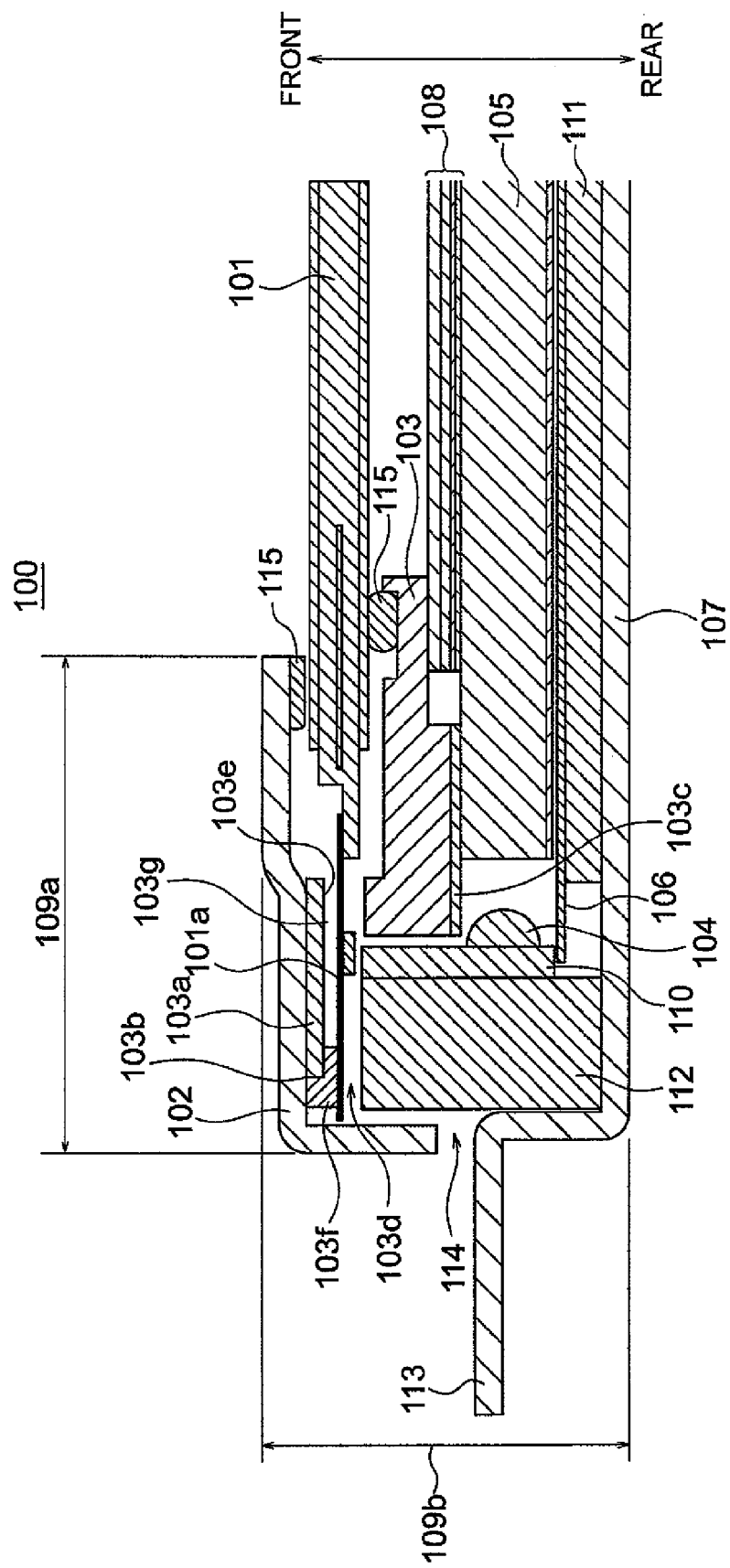
FIG. 1 is a partially cross-sectional view showing a configuration of a liquid crystal display according to an embodiment of the present invention.

In the following, an embodiment of the present invention will be described in detail with reference to the accompanying drawings. Note that, through the drawings, components having the same functions are denoted by the same reference numerals, and redundant descriptions will be omitted as far as possible.

FIG. 1 is a partially cross-sectional view showing a liquid crystal display according to an embodiment of the present invention. Reference numeral 100 denotes a liquid crystal display according to the present invention, reference numeral 101 denotes a liquid crystal panel, reference numeral 101a denotes a gate chip on film (COF), reference numeral 104 denotes a light emitting diode (LED) serving as a light source, reference numeral 102 denotes a front cover, reference numeral 103 denotes a frame, reference numeral 103*a* denotes a lid, reference numeral 103*b* denotes a hinge, reference numeral 103*c* denotes a reflecting surface that is disposed on the rear surface of the frame 103 to reflect light emitted from the LED 104, reference numeral 103*d* denotes a clearance for accommodating the gate COF 101*a*, reference numeral 103*e* denotes a reflecting surface disposed on the rear surface of the lid 103*a*, and reference numeral 103*f* denotes a hinge holding part that supports the hinge 103*b* and is connected to the frame 103. Reference numeral 103*g* denotes an opening formed in the frame 103 at a position corresponding to the position of the gate COF 101*a* into which the gate COF 101*a* is inserted, and the opening 103*g* is in communication with the clearance for the gate COF 101*a*. Reference numeral 105 denotes a light guide plate, reference numeral 106 denotes a reflecting sheet, reference numeral 107 denotes a rear cover, reference numeral 108 denotes an optical sheet, reference numeral 109*a* denotes the width of a rim part, reference numeral 109*b* denotes the thickness of the rim part, reference numeral 110 denotes a substrate of the LED 104, reference numeral 111 denotes a holding member, reference numeral 112 denotes a supporting frame, reference numeral 113 denotes a canopy of the rear cover 107, reference numeral 114 denotes an opening, and reference numeral 115 denotes a cushioning member. The supporting frame 112 is an aluminum block, for example. The reflecting surface 103*e* disposed on the rear surface of the lid 103*a* is made of the same material as the reflecting surface 103*c*.

As shown in FIG. 1, the liquid crystal display 100 according to the present invention has the rear cover 107 that has the shape of a box provided with a surrounding flange (canopy 113).

In this specification, the side of the liquid crystal display 100 provided with the liquid crystal panel 101 (the front surface of the liquid crystal panel 101, that is, the side provided with the display screen) is referred to as front side, the side provided with the rear cover 107 (the rear surface of the liquid crystal display 100) is referred to as rear side, and the left side in the drawing is referred to as left side. The top side in the drawing is referred to as top side, and the bottom side in the drawing is referred to as bottom side.

The bottom surfaces of the optical sheet 108, the light guide plate 105, the reflecting sheet 106 and the rear cover 107 are parallel with the front and rear surfaces of the liquid crystal panel 101.

The bottom of the rear cover 107 is a substantially flat surface, on which the reflecting sheet 106 is secured by the holding member 111. The light guide plate 105 is disposed in front of the light guide plate 106, and the optical sheet 108 is disposed in front of the light guide plate 105. The optical sheet 108 is disposed to cover the whole of the effective pixel area of the liquid crystal panel 101. The frame 103 connected to the rear cover 107 is disposed on the edge part of the light guide plate 105 and holds the holding member 111, the reflecting sheet 106, the light guide plate 105 and the optical sheet 108 in the depth direction, the transverse direction and the vertical direction. In addition, the liquid crystal panel 101 is disposed in front of the frame 103.

The LEDs 104 serving as a backlight light source are disposed on the left and right sides of the light guide plate 105, and the light from the LEDs 104 is incident into the light guide plate 105. The light is emitted from the LEDs 104 in a direction substantially parallel with the display screen of the liquid crystal panel 101 and travels from the left and right sides of the liquid crystal panel 101 toward the center of the liquid crystal panel 101. Since the reflecting sheet 106 is disposed on the rear surface of the light guide plate 105, the light incident into the light guide plate 105 is reflected toward the front side (toward the liquid crystal panel 101) by the reflecting sheet 106 and thus uniformly applied to the liquid crystal panel 101 in front thereof. Viewed from the front side, the liquid crystal panel 101, the optical sheet 108, the light guide plate 105 and the reflecting sheet 106 are located substantially at the same position. The light guide plate 105 and the reflecting sheet 106 is slightly larger than the liquid crystal panel 101, so that the liquid crystal panel 101 is efficiently illuminated with the light from the light guide plate 105.

A plurality of LEDs 104 are installed on the substrate 110 that extends in the vertical direction along the liquid crystal panel 101, and the substrate 110 is fixed to the supporting frame 112. As the LEDs 104, for example, one to three columns of a plurality of light emitting diodes that emit red, blue, green or other color are mounted on the substrate 110, and a plurality of such substrates 110 are disposed on the left and right sides of the light guide plate 105.

For example, in the case of a 37-inch liquid crystal display, a total of about 500 LEDs 104, which are mounted on four separate substrates 110, are installed on each of the left and right sides.

The gate COF 101*a* is mounted on each of the left and right peripheral edge parts of the liquid crystal panel 101 and inserted in the opening 103*g* in the frame 103 to protrude in the clearance 103*d* that is formed between the supporting frame 112 and the hinge holding part 103*f* and is in spatial communication with the opening 103*g*. The lid 103*a*, which is integrally molded with the hinge 103*b*, is disposed in front of the gate COF 101*a*, and the rear surface of the lid 103*a* (that is, the surface facing the gate COF 101*a*) constitutes the reflecting surface 103*e*. As described later, the lid 103*a* is designed to open to the front. The cushioning member 115 is disposed on the rear surface of the front cover 102 and on the front surface of the frame 103, and the peripheral edge part of the liquid crystal panel 101 is sandwiched between the cushioning member 115 on the front cover 102 in front thereof and the cushioning member 115 on the frame 103 at the rear thereof. Although the cushioning member 115 on the front cover 102 is not in contact with the liquid crystal panel 101 in FIG. 1, the cushioning member 115 is actually in contact with the liquid crystal panel 101 at a plurality of points.

The substrate 110 on which the LED 114 is mounted has wiring that is led to the rear of the rear cover 107 through the clearance 103*d*, the opening 114 and then an opening (not shown) formed in the canopy 113 of the rear cover 107.

Illustration of the wiring is omitted in the drawings of the present invention including FIG. 1.

Figure 2:
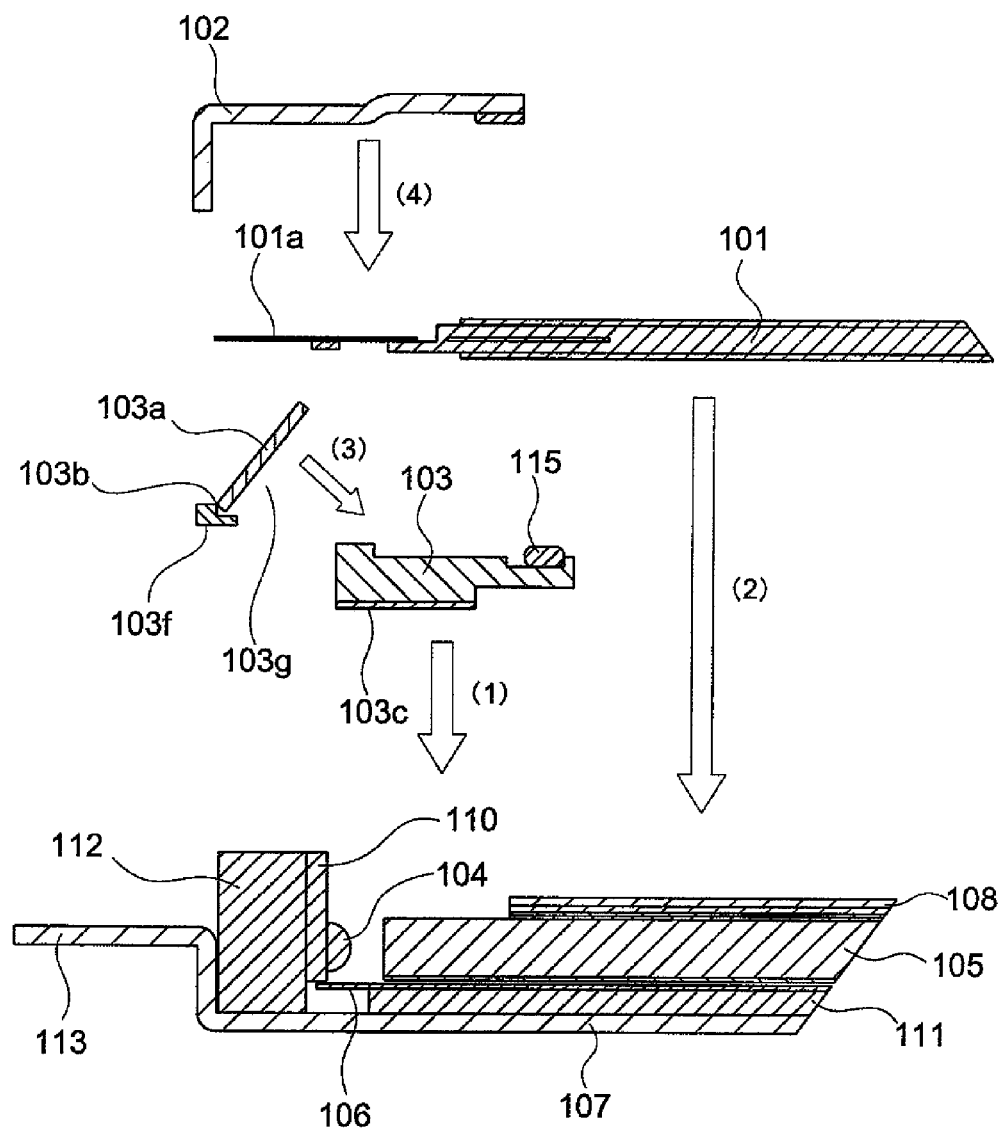
FIG. 2 is a partially exploded cross-sectional view for illustrating a procedure of assembling the liquid crystal display according to the embodiment.

FIG. 2 is a partially exploded cross-sectional view for illustrating a procedure of mounting the liquid crystal panel 101 on the liquid crystal display described above with reference to FIG. 1.

The holding member 111, the reflecting sheet 106, the light guide plate 105, the optical sheet 108, the supporting frame 112, the substrate 110 and the LED 104 have been already mounted on the rear cover 107.

In this state, the frame 103 is further mounted as shown by the arrow (1). Then, as shown by the arrow (2), the liquid crystal panel 101 to which the gate COF 101*a* is connected is mounted by inserting into the opening 103*g* formed in the frame 103. A part (tip end) of the gate COF 101*a* inserted in the opening 103*g* is exposed to the outside of the frame 103 through the clearance 103*d* as described above. In other words, the gate COF 101*a* penetrates the frame 103 through the clearance 103d. In this step, the lid 103a is opened to allow installation of the gate COF 101a. Furthermore, after the gate COF 101a is mounted, as shown by the arrow (3), the lid 103a open is closed to cover the gate COF 101a. Thus, light leakage through the opening 103g is reduced or eliminated. Then, as shown by the arrow (4), the front cover 102 is mounted.

As described above, the reflecting surface 103e is formed by coating with a light reflecting coating or the like on a part of the rear surface of the lid 103a that faces the gate COF 101a installed.

For disassembly, the assembly procedure described above can be reversed as shown in FIGS. 3A to 3D, for example. Specifically, beginning with the liquid crystal display yet to be disassembled shown in FIG. 3A, the front cover 102 is removed as shown in FIG. 3B. Then, as shown in FIG. 3C, the lid 103a is opened. Then, the liquid crystal panel 101 to which the gate COF 101a is connected is removed as shown in FIG. 3D. Finally, the frame 103 is removed.

As described above, according to this embodiment, the frame 103 has the opening 103g formed at a position corresponding to the position of the gate COF 131a and the lid 103a that is connected thereto via the hinge 103b and covers the gate COF 101a inserted in the opening 103g, so that light leakage around the gate COF 101a is prevented. The gate COF 101a inserted in the opening 103g extends through the clearance 103d formed in the frame 103 and is connected to wiring that supplies a signal that drives the liquid crystal panel 101 to the gate COF 101a.

In addition, since the reflecting surface 103e is disposed on the back surface (rear surface) of the lid 103a, light that leaks around the gate COF 101a can be redirected to the light guide plate 105, and thus, the light emission efficiency can be improved.

Furthermore, although the lid 103a connected to the frame 103 via the hinge 103b is opened when the liquid crystal panel 101 is mounted, the lid 103a is closed to prevent light leakage once the liquid crystal panel is mounted. According to this embodiment, the hinge 103b and the lid 103a are integrally molded from a rigid plastic or the like. Since the lid 103a and the hinge 103b are integrally molded as described above, the number of components is reduced, and the cost and the number of assembly steps are reduced. In addition, if the coating process for forming the reflecting surface 103e is omitted by integrally molding the hinge 103b and the lid 103a from the same material as the reflecting surface 103c disposed on the rear of the frame 103, the manufacturing cost can be further reduced.

In the description of the procedure of mounting the liquid crystal panel 101 shown in FIG. 2, the holding member 111, the reflecting sheet 106, the light guide plate 105, the optical sheet 108, the supporting frame 112, the substrate 110 and the LED 104 have been already mounted on the rear cover 107. For example, according to a procedure of mounting these components, the holding member 111 is mounted on the rear cover 107, and then the reflecting sheet 106 is mounted. Then, the supporting member 112, to which the substrate 110 having the LED 104 mounted thereon is already attached, is mounted. Then, the light guide plate 105 is mounted, and then the optical sheet 108 is mounted.

Next, with reference to FIGS. 4A to 4B and 5A to 5B, a portion of the liquid crystal display according to this embodiment including the front cover 102, the lid 103a and the hinge 103b will be described in detail. FIGS. 4A to 4B are perspective views showing a state where the lid 103a is closed. FIG. 4B is a general view, and FIG. 4A is an enlarged view of a part of FIG. 4B (a part 401 enclosed in the dashed frame). FIGS. 5A to 5B are perspective views showing a state where the lid 103a is open. FIG. 5B is a general view, and FIG. 5A is an enlarged view of a part of FIG. 5B (a part 501 enclosed in the dashed frame). FIGS. 4A to 4B and 5A to 5B schematically show the peripheral edge part of the liquid crystal display 100 shown in FIG. 1, and illustration of the holding member 111, the reflecting sheet 106, the light guide plate 105 and the optical sheet 108, which are shown in FIG. 1, is omitted. In addition, in FIGS. 4B and 5B, illustration of the front cover 102 on the right side is omitted. In addition, for clarity of the lid 103a and the hinge 103b, FIGS. 4A to 4B and 5A to 5B shows a state where the front cover 102 is yet to be mounted.

In the cross-sectional view of FIG. 1, the front cover 102, the lid 103a, the hinge 103b and the like are shown as floating in the air. However, as shown in FIGS. 4A to 4B, the hinge 103b is supported by the hinge holding member 103f, the hinge holding member 103f is connected to the frame 103, and the front cover 102 is secured and supported by the frame 103 and the hinge holding member 103f. In addition, the frame 103 is secured and supported by the supporting frame 112 at a part other than the part on which the gate COF 101a is mounted.

As shown in FIG. 4B, a plurality of lids 103a are provided at a part of the frame 103, and each lid 103a is positioned at one opening 103g associated with one gate COF 101a mounted on a predetermined part of the liquid crystal panel 101. Note that reference numeral 402 denotes a front-side frame, and reference numeral 403 denotes a rear-side frame.

FIG. 5B shows a state where the lid 103a is open. When the lid 103a is open, the opening 103g is not blocked, so that the gate COF 101a can be inserted. The lid 103a is integrally molded with the hinge 103b fixed to the frame 103 and can be opened and closed by pivoting about the hinge 103b. The lid 103a integrally molded with the hinge 103b is made of a rigid plastic, for example.

Figure 6B:
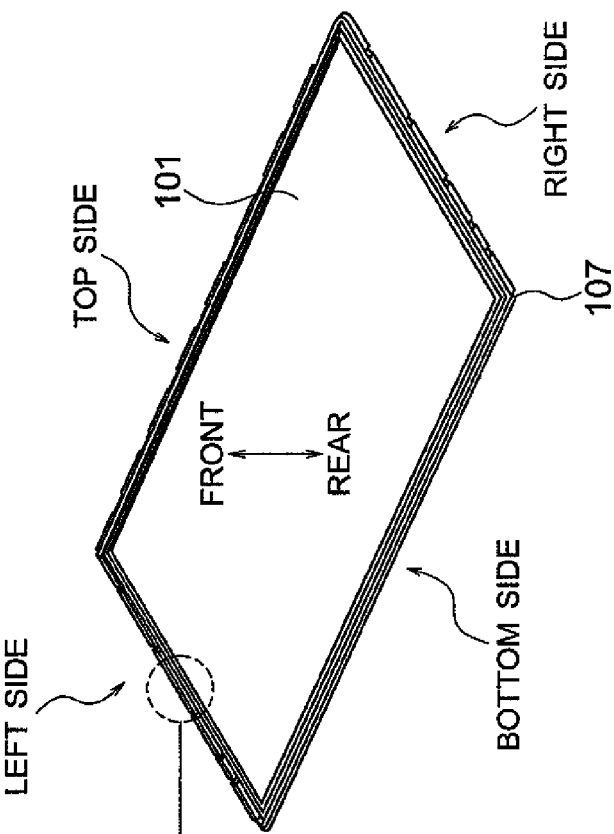
FIG. 6 includes perspective views showing a state where the lid 103a according to the embodiment is open.
Figure 6A:
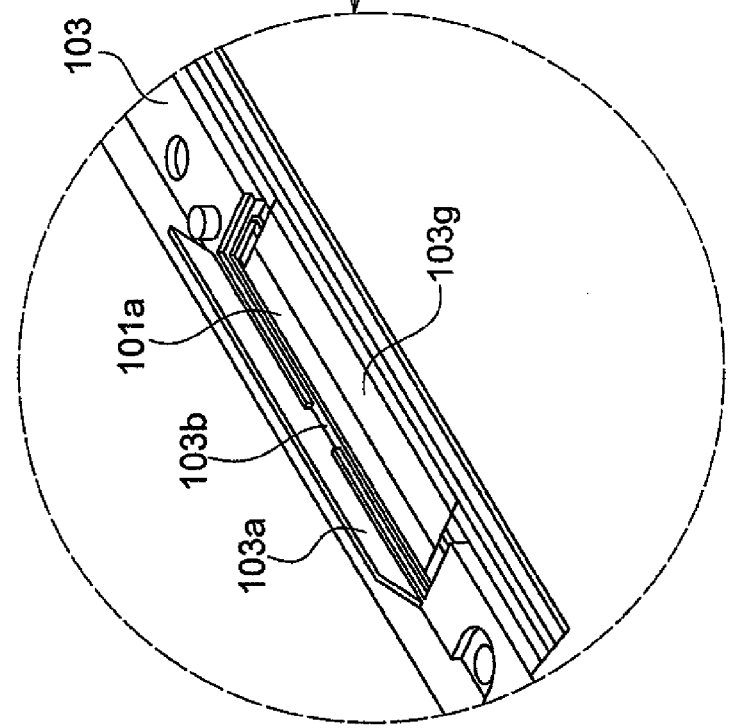

FIGS. 6A to 6B and 7A to 7B are partial perspective views showing a part including the lid 103a and the hinge 103b in more detail. FIG. 6A is a partial perspective view showing a state where the lid 103a is open, and FIG. 7A is a partial perspective view showing a state where the lid 103a is open. FIG. 6A is an enlarged view of a part of FIG. 6B enclosed in the dashed circle, and FIG. 7A is an enlarged view of a part of FIG. 7B enclosed in the dashed circle.

As shown in FIGS. 6A to 6B and 7A to 7B, the hinge 103b is attached to the hinge holding part 103f, and the lid 103a is open and closed by pivoting about the hinge 103b.

Furthermore, at least one of the lid 103a and the frame 103 may have a claw-like protrusion, and the other may have a slit to engage with the protrusion so that the lid 103a can be automatically fixed to the frame 103 when the lid 103a is closed.

In the conventional structure, the front cover 102 has to cover the gate COF 101a, and therefore, the width of the front cover 102 (that is, the width of the rim) is larger than the gate COF 101a. As a result, the width of the rim of the liquid crystal display is also large. However, in the structure according to this embodiment described above, the width 109a of the rim part can be reduced.

In addition, since the rear surface of the lid 103a is a reflecting surface, light leakage can be reduced by redirecting to the light guide plate by reflection. Thus, the emission efficiency can be improved.

In addition, since the hinge 103b and the lid 103a are integrally molded, the cost and the number of assembly steps can be reduced. The hinge 103b and the lid 103a are preferably integrally molded from the same light reflecting material as the reflecting surface 103c. Then, since the process of attaching the reflecting surface 103e to the lid 103a can be omitted, the cost and the number of assembly step can be further reduced. Alternatively, although the number of components increases, the frame 103, the hinge 103*b* and the lid 103*a* may be separate components, and the frame 103 and the lid 103*a* may be coupled to each other by the hinge 103*b* in such a manner that the lid 103*a* can be opened and closed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display, comprising:
   a liquid crystal panel;
   a gate chip on film (COF) disposed at a side of a side surface of the liquid crystal panel;
   side-edge-type backlights having a light emitting diode disposed on left and right side surfaces of the liquid crystal panel; and
   a cover and a frame that hold the liquid crystal panel and the backlights,
   wherein the frame has an opening disposed at a position corresponding to the position of the gate COF into which the gate COF is inserted, and a lid for covering the gate COF inserted in the opening is connected to the frame in such a manner that the lid is capable of being opened and closed.

2. The liquid crystal display according to claim 1, wherein the lid is connected to the frame via a hinge in such a manner that the lid is capable of being opened and closed.

3. The liquid crystal display according to claim 1 or claim 2, wherein the frame has a reflecting surface on a surface that faces the cover.

4. The liquid crystal display according to claim 3, wherein the lid and the hinge are made of a same material as the reflecting surface.

5. The liquid crystal display according to claim 2, wherein the lid, the hinge and the frame are integrally molded.

6. The liquid crystal display according to claim 1, wherein the lid has a reflecting surface on a surface that faces the gate COF.

7. The liquid crystal display according to claim 1, wherein for cooperating with the cover to sandwich the frame another cover is disposed at a side of the lid that is on the side of a front surface of the liquid crystal panel.

* * * * *